G. B. DUSINBERRE.
TROLLEY HANGER.
APPLICATION FILED FEB. 25, 1908.
931,400.  Patented Aug. 17, 1909.
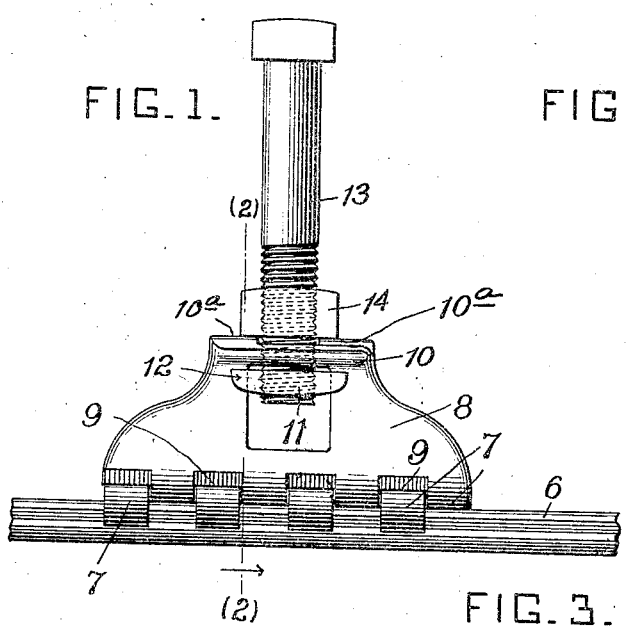
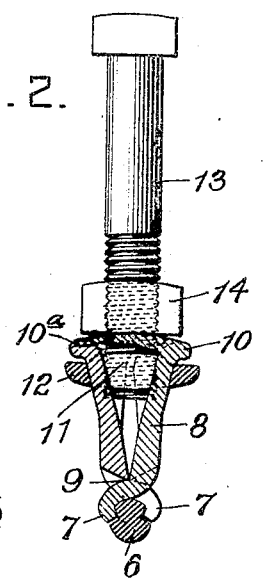
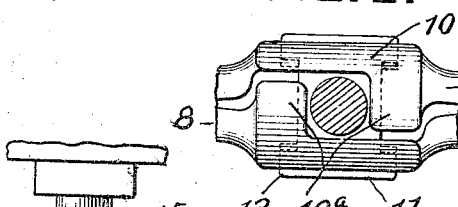
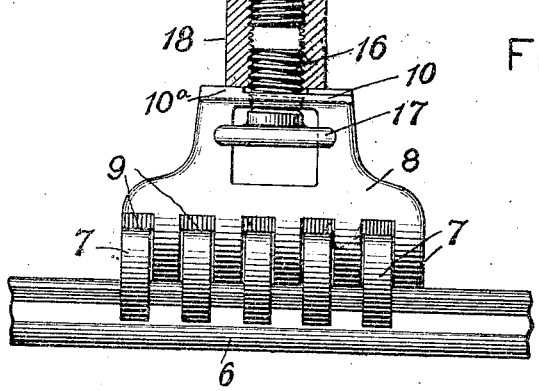
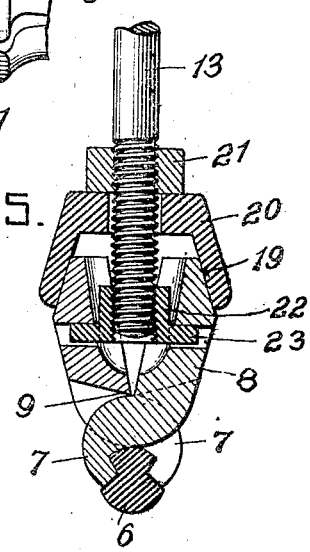
WITNESSES:
George B. Dusinberre INVENTOR

UNITED STATES PATENT OFFICE.

GEORGE B. DUSINBERRE, OF CLEVELAND, OHIO, ASSIGNOR TO WESTINGHOUSE ELECTRIC & MANUFACTURING COMPANY, A CORPORATION OF PENNSYLVANIA.

TROLLEY-HANGER.

No. 931,400.　　　Specification of Letters Patent.　　　Patented Aug. 17, 1909.

Application filed February 25, 1908. Serial No. 417,638.

*To all whom it may concern:*

Be it known that I, GEORGE B. DUSINBERRE, a citizen of the United States, residing at Cleveland, in the State of Ohio, have invented certain new and useful Improvements in Trolley-Hangers, of which the following is a specification.

My invention relates to trolley wire hangers or clamps, and its primary object is to provide for adjustability, to increase the clamping power and to improve the fastening means.

A further object is to cheapen and simplify the construction.

In the accompanying drawings illustrating several forms of the invention: Figures 1 and 2, are, respectively, a side elevation and a vertical section of one form of clamp, and Fig. 3 a plan of the lever arms. Fig. 4 is a view partially in vertical section and partially in side elevation of a modified form, and Fig. 5 is a vertical section of another modification.

In order to secure a firm hold of the clamp on the wire, it is essential to get a very powerful and unvarying leverage grip, as experiment has shown that all clamps are much stronger if designed to prevent the initial start of the wire from its normal seat, since, when slipping has once begun, the hold of the clamp is very much weakened. As there is a very limited amount of metal which can be used in the jaws of a clamp, the location of the pivot point for the lever action is very important, and, manifestly, it is desirable to increase the normal power of any such means as a screw or nut used for inducing the pressure on the jaws. I combine the lever and wedge actions in supplying this pressure.

In Fig. 1, the wire 6 is held by the interlacing teeth 7 of jaws formed on two members 8 which constitute levers having pivotal connection with each other at points 9 between the teeth and have upwardly inclined extensions 10 which are engaged by a locking member 11. The locking member 11 is shown as a nut having lugs 12 which engage the outer surfaces of the extensions 10 and as being adapted for adjustment by means of a suspending bolt 13 and a coöperating nut 14.

It will be observed by reference to Fig. 3 that the ends of the levers 8 are provided with lateral projections 10ª upon which the nut 14 may bear. A double bell-crank lever is thus provided upon which the nuts 11 and 14 act jointly to force the teeth 7 into engagement with the wire 6. It will be noted that any tendency of the nut 14 to unscrew will be resisted by the friction between it and the projections 10ª as well as by the leverage action of the members 8, 10ª. This construction also permits of an adjustment of the clamping members upon the bolt 13 in accordance with the length of hanger desired. By these means I obtain a strong lever-and-wedge action for locking the jaws, as well as a very superior nut lock, which all tends to prevent the clamp from jarring loose, and the location of the fulcrum points 9 close to the wire 6 insures a very powerful grip.

In assembling the structure, the members 8 are placed in approximately the positions shown in the drawings and the member 11 inserted by turning it to an inclined position. After the member 11 is inserted and adjusted to its operative position, the bolt 13 is screwed into it and the nut 14 is manipulated to effect the desired clamping action between the jaw teeth 7.

The modification shown in Fig. 4 is specially designed for use with insulating hangers having a projecting screw stud 15. In this case, the locking member which coöperates with the inclined lever extensions 10 is in the form of a stud 16 having projecting lugs 17 to engage the inclined sides of the lever extensions. The locking member 16 is drawn up to tighten the gripping jaws 7, by means of a nut 18 which is provided with right and left threads to engage the studs 15 and 16 at the same time and draw them together.

In the modification shown in Fig. 5, the extensions of the members 8 are made in conical form with inclined surfaces 19 which are engaged by a conical sleeve 20 which is forced downwardly by a nut 21. The hanger rod 13 screws into a nut 22 having laterally projecting lugs 23 which engage openings in the members 8. Obviously, the nut 22 might be integral with the hanger rod, if desired, and nut 21 might also be integral with the sleeve 20. The members 20, 21 and 22 serve to draw the clamp jaws firmly together and, by a combined wedge-and-lever action, they cause the jaw teeth to exert a very powerful and steady grip.

It will be noted that, in each form of my invention, the lever members are alike and therefore interchangeable, cheapness of manufacture and ease of assembly being thus facilitated.

It will be observed that in all the forms shown the parts are readily assembled and the same means which adjust the clamp on the hanger rod also locks it to the wire.

I claim as my invention:

1. A trolley wire clamp comprising a pair of identically constructed jaws having interlacing teeth and pivoted upon each other and provided with upwardly extending lever arms having inclined outer surfaces, a coöperating member having projections to engage said surfaces and means for actuating said member to close said jaws.

2. The combination with a pair of crossed bell crank levers having interlacing jaw teeth and means for exerting pressure upon both arms of said levers to close the jaws.

3. The combination with a pair of lever members having interlacing teeth forming clamping jaws, wedge-acting means serving to draw the lever members together and means to simultaneously operate the wedge acting means and attach the jaws to a hanger rod.

4. A trolley wire clamp having jaw member lever arms provided with inclined side surfaces and lateral end projections, a longitudinally movable device adapted to engage said inclined surfaces, and a screw and nut for actuating said longitudinally movable device.

5. In a trolley wire clamp, a pair of bell crank levers having end clamping jaws and a locking means comprising a bolt and two nuts thereon, said nuts coöperating, respectively, with the arms of said bell crank levers.

6. The combination with a hanger rod having a screw threaded end, of a trolley clamp comprising two crossed bell crank levers having jaws at their lower ends, and fulcrumed upon each other at the bases of the jaws and nuts mounted upon the screw-threaded end of the hanger rod and acting upon the upper ends of the levers to close the jaws.

7. In a trolley wire support, a pair of clamping jaws having extensions in the form of bell crank levers, and means for exerting vertical pressure upon the tops of the levers and lateral pressure upon their sides to close the jaws.

8. The combination with a hanger rod having wedge-acting means and a nut, of a pair of clamping jaws having operating lever arms which are engaged by the nut and wedge-acting means simultaneously to force the clamping jaws toward each other.

In testimony whereof I have hereunto signed my name in the presence of the two subscribed witnesses.

GEO. B. DUSINBERRE.

Witnesses:
 JNO. P. WITT,
 E. L. CLOUGH.